Jan. 9, 1968   B. F. BICKMAN   3,362,234
CONTROL APPARATUS

Filed July 12, 1965   2 Sheets-Sheet 1

INVENTOR.
BERNARD F. BICKMAN
BY
ATTORNEY

Jan. 9, 1968　　　B. F. BICKMAN　　　3,362,234
CONTROL APPARATUS
Filed July 12, 1965　　　2 Sheets-Sheet 2
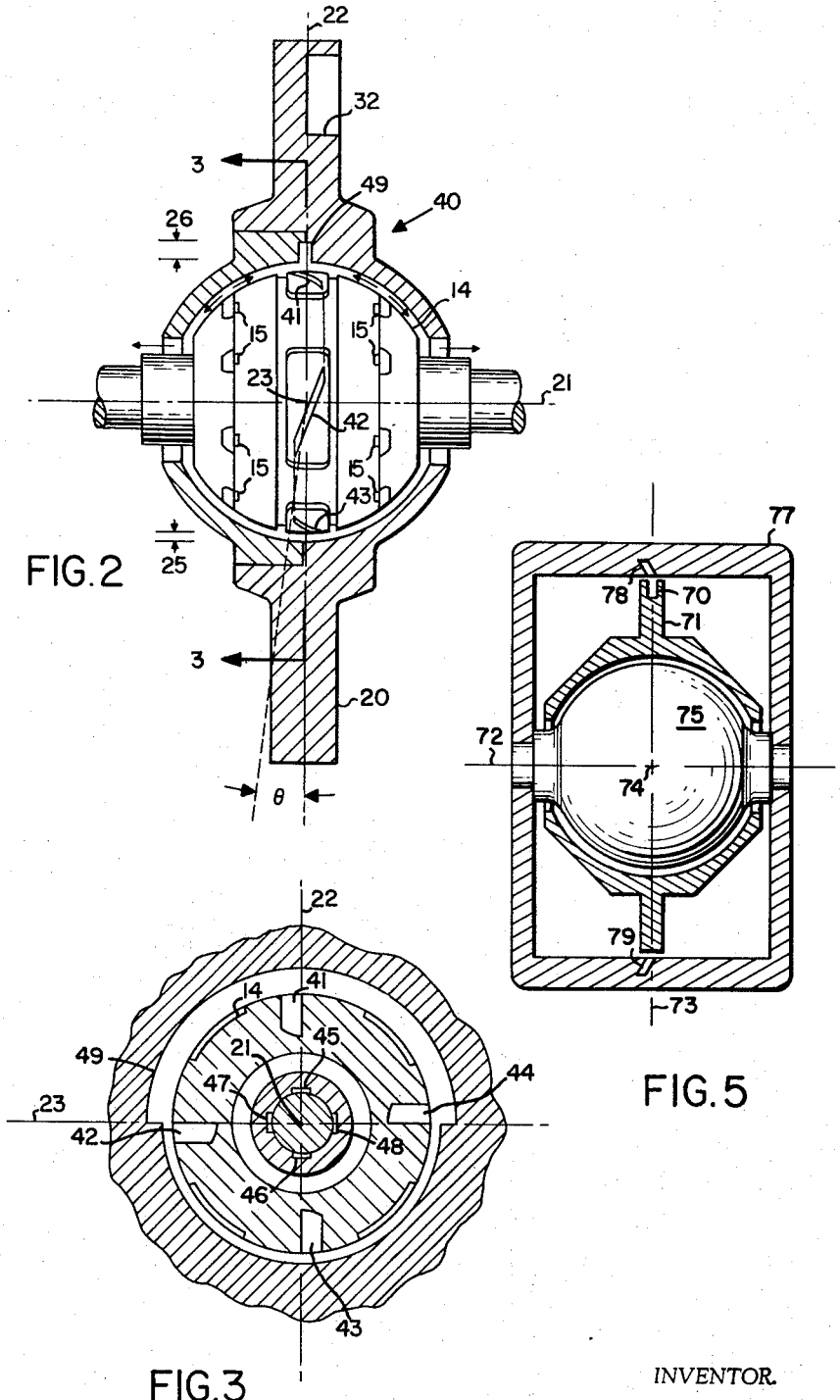
INVENTOR.
BERNARD F. BICKMAN
BY Ronald T. Reiling
ATTORNEY

United States Patent Office 3,362,234
Patented Jan. 9, 1968

3,362,234
CONTROL APPARATUS
Bernard F. Bickman, Minneapolis, Minn., assignor to Honeywell Inc., Minneapolis, Minn., a corporation of Delaware
Filed July 12, 1965, Ser. No. 471,060
5 Claims. (Cl. 74—5.6)

This invention pertains to a signal generator, and more particularly to a fluid signal generator providing an output signal indicative of the displacement of a member relative to an axis.

The applicant has provided a unique low-cost fluid signal generator having high reliability and improved accuracy. The low cost is obtained because of the high produceability of the fluid signal generator. Fluid passages replace the conventional wires and wipers of the prior art electrical signal generators thereby substantially reducing fabrication and assembly cost. High reliability is inherent because of the simplicity of the applicant's fluid signal generator. The lack of wires, connections, and sliding surfaces eliminates all of the common sources of failure. Improved accuracy is obtained by the unique design that eliminate cross-coupling between the sensitive axes and permits simultaneous sensing of angular displacements about two axes. The accuracy is also improved by providing a phase modulated or pulse width modulated output signal. The utilization of a phase modulated or pulse width modulated output signal permits a simple OFF, ON digital control system approach which is more amenable to low-cost control than prior art analog control schemes.

The applicant's invention has particular application to a gyroscope and will be explained with reference thereto. However, it should be understood that the applicant's invention is not limited to utilization in a gyroscope. In one particular embodiment, the applicant's fluid signal generator utilizes the spin-rate of a gyroscope rotor about its spin axis to provide a clock frequency. The gyro rotor is hydrostatically supported by a fluid for rotary movement relative to three intersecting axes including the spin axis. A first and a second radial clearance is provided between the rotor and bearing means. The difference in radial clearance between the rotor and the bearing means in conjunction with the flow of fluid therebetween is effective to provide a first pressure in the first radial clearance and a second pressure in the second radial clearance. Fluid flow or pressure sensing means, fixed with respect to the housing, are provided to sense the two different pressure levels and provide a plurality of pressure pulses upon rotation of the rotor. The fluid flow or pressure sensing means are oriented with respect to the rotor such that rotary movement of the rotor relative to the second or third axes results in a phase modulated output signal indicative of the rotary movement. The fluid flow or pressure sensing means may be connected to fluid amplifier means integral with the gyroscope so as to provide a pulse width modulated output signal indicative of the rotary movement of the rotor about the second or third axes.

The scope of the invention will become apparent from the study of the accompanying specification and claims in conjunction with the drawings in which:

FIGURE 2 is an enlarged partial cross-sectional view of the gyroscope of FIGURE 1;

FIGURE 3 is a cross-sectional view taken along section line 3—3 of FIGURE 2;

FIGURE 5 is a cross-sectional view of an alternate embodiment of the applicant's invention.

Figure 1:
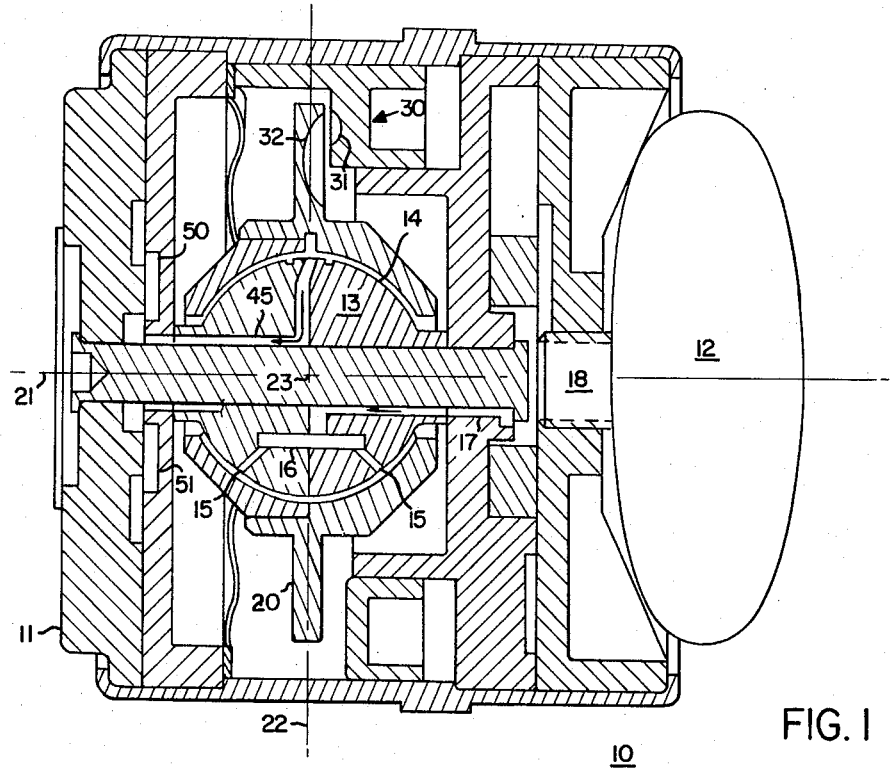
FIGURE 1 is a cross-sectional view of a gyroscope utilizing the applicant's fluid signal generator.

Referring now to FIGURES 1 and 2, reference numeral 10 generally depicts a gimballess, free rotor gyroscope. The gyroscope includes a housing means 11 having a source of high-pressure fluid 12 integral therewith. The source of high-pressure fluid may be either a cold or a hot gas generator. Of course, the source of fluid may be remote from the gyroscope 10.

A hydrostatic bearing means 13 is provided within housing 11. Hydrostatic bearing means 13 includes a substantially spherical bearing element 14 rigidly attached to housing 11. Bearing element 14 has a plurality of bearing orifices 15 located therein. Orifices 15 are connected to high-pressure fluid source 12 by means of a manifold 16, a plurality of conduits 17, and a discharge element 18 which releases the fluid from source 12.

An annular rotor 20 surrounds bearing 13. Bearing means 13 supports a rotor 20 for rotary movement about three intersecting axes 21, 22, and 23. Axes 21, 22, and 23 are illustrated in FIGURES 1 and 2 as three orthogonal axes but any three axes may be utilized. Axis 21 is identified as the spin axis. Rotor 20, as illustrated in FIGURES 1 and 2, is symmetrical about spin axis 21. Rotor 20 is spaced apart from bearing element 14 so as to provide a first radial clearance 25 therebetween.

Means 30 are provided for driving rotor 20 about spin axis 21 at a substantially constant angular velocity. Means 30 in the particular embodiment illustrated in FIGURES 1 and 2 includes a spin-up nozzle 31 which is supplied with fluid from source 12 through suitable conduit means (not shown) and turbine buckets 32 on rotor 20. Fluid exhausting from spin-up nozzle 31 impinges upon turbine buckets 32 of rotor 20 causing rotor 20 to rotate about spin axis 21 at a substantially constant angular velocity.

A fluid signal generator 40 is provided for sensing the rotary movement of rotor 20 about axes 22 and 23. Fluid signal generator 40 includes two pair of diametrically opposed elongated slots 41, 42, 43, and 44 in the surface of bearing element 14. Elongated slots 41, 42, 43, and 44 are equally angularly spaced about axis 21 (see FIGURE 3). This is the preferred orientation of the slots, but it is not necessary for operation of the applicant's fluid generator means that these slots be equally spaced. Slots 41 and 43 form a first pair of fluid flow or pressure sensing means which sense the rotary movement of rotor 20 about axis 23. Slots 42 and 44 form a second pair of fluid flow or pressure sensing means which sense the rotary movement of rotor 20 about axis 22. Slots 41 and 43 lie on great circles on spherical bearing element 14 which are oppositely oblique with respect to spin axis 21. Slots 42 and 44 also lie on great circles which are oppositely oblique with respect to spin axis 21. Slots 41 and 43 are connected by conduits 45 and 46 to the control passages of a fluid amplifier 50 which is integral with housing 11. Slots 42 and 44 are connected by conduits 47 and 48 to the control ports of a fluid amplifier 51 integral with housing means 11. Although a pair of slots are illustrated for each axis, it should be pointed out that only a single slot is necessary. Furthermore, although the signals from the slots are amplified by fluid amplifiers 50 and 51 and the particular embodiment illustrated, the signals from the slots may be utilized without amplification by fluid amplifiers. Fluid signal generator 40 also includes a groove 49 in the inner periphery of rotor 20 that extends 180 degrees around spin axis 21 (see FIGURE 3). It should be noted that groove 49 may extend about spin axis through various angles less than 360 degrees and is not restricted to 180 degrees. Groove 49 defines a second radial clearance 26 between bearing element 14 and the inner periphery of rotor 20 that is different from radial clearance 25.

The operation of gyro 10 is initiated by activating means 18 which releases fluid from source 12. The fluid is directed through conduits 17 and manifold 16 to bearing orifices 15 so that hydrostatic bearing means 13 supports rotor 20 for rotary motion about three intersecting axes 21, 22, and 23. Fluid is also directed through suitable conduits to means 30 for driving rotor 20 about axis 21 at substantially constant angular velocity. The fluid flowing from source 12 through orifices 15 of hydrostatic bearing means 13 flows between rotor 20 and bearing element 14 as illustrated by the arrows in FIGURE 2. Radial clearance 26 provides less restriction to the fluid flow than radial clearance 25. The differences in radial clearance between the inner periphery rotor 20 and bearing element 14 in conjunction with the flow of fluid therebetween are effective to provide a first pressure in the first radial clearance and a second pressure in the second radial clearance (groove 49). In practice, the pressure in groove 49 is higher than the pressure existing in radial clearance 25 between bearing element 14 and inner periphery of rotor 20. With reference to FIGURE 3, it is clear that each slot 41, 42, 43, and 44 will sense the pressure existing in groove 49 for 180 degrees of revolution of rotor 20 about axis 21 and will sense the pressure existing in radial clearance 25 between rotor 20 and bearing means 14 for the remainder of the revolution of rotor 20. Thus each slot senses a single-pressure pulse per revolution.

Figure 4:
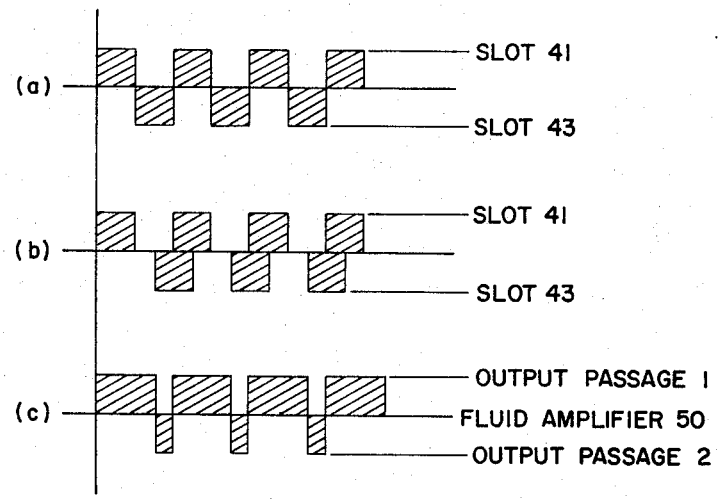
FIGURE 4 is a schematic representation of the output signal of the fluid signal generator.

The output signal from slots 41 and 43 is illustrated in FIGURE 4. With rotor 20 rotating at a substantially constant angular velocity, a plurality of equal width pressure pulses is obtained from each slot. With groove 49 extending 180 degrees around axis 21, a square wave signal is obtained. The shape of the output signal will vary, of course, with the arcuate extent of groove 49. When rotor 20 is in its normal or null position with respect to axis 23, the output signal illustrated in FIGURE 4(a) will be obtained.

When rotor 20 is subjected to a rotary motion about axis 23 through an angle θ as illustrated in FIGURE 2, groove 49 is displaced relative to slots 41 and 43. More specifically, groove 49 will pass over a different portion of slots 41 and 43 as rotor 20 rotates about axis 21. Since slots 41 and 43 lie on great circles that are oppositely oblique to spin axis 21, the leading edge of groove 49 must travel further than 180 degrees from slot 41 to reach slot 43. However, the leading edge of groove 49 travels less than 180 degrees from slot 43 to reach slot 41 again. This results in a phase shift in the output signal of slots 41 and 43 as illustrated in FIGURE 4(b). The magnitude of the phase shift is indicative of the rotary movement of rotor 20 about axis 23.

When slots 41 and 43 are connected to bistable fluid amplifier 50, a pulse width modulated output signal is obtained. A pulse width modulated signal is obtained because the bistable fluid amplifier continues to provide the same output signal until switched by a control signal. With reference to FIGURE 4(c), assume that a pressure pulse in slot 41 (which is connected to fluid amplifier 50) provides an output signal in output passage 1 of amplifier 50. After rotor 20 is rotated 180 degrees about axis 21, the pressure pulse in slot 41 is terminated (see FIGURE 4(b)). However, fluid amplifier 50 continues to provide an output signal in output passage 1 until a pressure pulse appears in slot 43. When a pressure pulse appears in slot 43, it switches the output signal of fluid amplifier 50 to output passage 2. The output signal from output passage 2 of fluid amplifier 50 continues until a pressure pulse appears in slot 41. This results in the pulse width modulated signal illustrated in FIGURE 4(c). The width of the pulses are indicative of the rotary movement of rotor 20 about axis 23.

FIGURE 5 illustrates an alternate embodiment of the applicant's invention wherein a groove 70 is provided in the outer periphery of a rotor 71 which is supported for rotary movement about three axes 72, 73, and 74 by a bearing means 75. A housing means 77 surrounds rotor 70 and contains two pair of elongated slots therein (such as 78 and 79) that are connected to suitable conduit means (not shown) so as to allow fluid to exhaust through the slots. Means (not shown) are connected to housing means 77 so as to provide fluid flow between the outer periphery of rotor 71 to housing means 77. The fluid signal generator illustrated in FIGURE 5 is essentially an inside-out version of the fluid signal generator described with reference to FIGURES 1 through 3. Consequently, a detailed explanation of the operation thereof is not deemed necessary.

Thus the applicant has provided a unique fluid signal generator which provides a phase modulated or pulse width modulated output signal which is indicative of the rotary movement of a member of an axis.

While I have shown and described the specific embodiments of the invention, further modification and improvements will occur to those skilled in the art. I desired to be understood, therefore, that this invention is not limited to the particular form shown, and I intend in the appended claims to cover all modifications which do not depart in the scope of this invention.

I claim:

1. A gyroscope comprising: housing means; a source of high pressure fluid integral with said housing means; substantially spherical hydrostatic bearing means; means connecting said bearing means to said source of high pressure fluid; said bearing means having two pair of diametrically opposed elongated slots in the surface thereof, the slots being equally angularly spaced about a spin axis, the slots of each pair of said two pair of slots lie on great circles which are oppositely oblique with respect to said spin axis; an annular rotor symmetrical about said spin axis surrounding said bearing means, said rotor and said bearing means having a first radial clearance therebetween, said bearing means supporting said rotor for rotary movement about three intersecting axes including said spin axis, said rotor having a groove in the inner periphery thereof that extends 180 degrees about said spin axis so as to define a second radial clearance between said rotor and said bearing means different from the first radial clearance, the difference in radial clearance between the inner periphery of said rotor and said bearing means in conjunction with the flow of fluid therebetween being effective to provide a first pressure in the first radial clearance and a second pressure in the groove; means for rotating said rotor about said spin axis at a substantially constant angular velocity, the rotation of said rotor causing relative movement between said slots and said groove whereby each slot senses the first pressure for a portion of a revolution of said rotor and senses the second pressure for the remainder of the revolution so as to provide a single pressure pulse per revolutioin; a pair of bistable fluid amplifiers integral with said housing means; and means connecting the slots of each pair of said two pair of slots to the control ports of one of said pair of fluid amplifiers, whereby one of said pair of fluid amplifiers provides a first plurality of pressure pulses, the width of the pulses of the first plurality of pulses being indicative of the rotary movement of said rotor about the second of the three intersecting axes, and the other pair of said two pair of fluid amplifiers providing a second plurality of pressure pulses, the width of the pulses of the second plurality of pressure pulses being indicative of the rotary movement of said rotor about the third of the three intersecting axes.

2. A gyroscope comprising: housing means; a source of high pressure fluid integral with said housing means; substantially spherical hydrostatic bearing means, means connecting said bearing means to said source of high pressure fluid; said bearing means having a first pair of diametrically opposed elongated slots and a second pair of diametrically opposed elongated slots in the surface thereof, the slots being equally angularly spaced about a spin axis, the slots of each pair of slots lie on great circles which are oppositely oblique with respect to said spin axis, an annular rotor symmetrical about said spin axis surrounding said bearing means, said rotor and said bearing means having a first radial clearance therebetween, said bearing means supporting said rotor for rotary movement about three intersecting axes including said spin axis, said rotor having a groove in the inner periphery thereof that extends less than 360 degrees about said spin axis so as to define a second radial clearance between said rotor and said bearing means different from the first radial clearance, the difference in radial clearance between the inner periphery of said rotor and said bearing means in conjunction with the flow of fluid therebetween being effective to provide a first pressure in the first radial clearance and a second pressure in the groove; means for rotating said rotor about said spin axis at a substantially constant angular velocity, the rotation of said rotor causing relative movement between said slots and said groove whereby each slot senses the first pressure for a portion of a revolution of said rotor and senses the second pressure for the remainder of the revolution, whereby each slot senses a train of pressure pulses, the phase between the pulses sensed by said first pair of slots being indicative of the rotary movement of said rotor about the second of the three intersecting axes, and the phase of the rotary movement of said rotor about the third of the three intersecting axes.

3. A gyroscope comprising: housing means; substantially spherical bearing means, said bearing means having two pair of diametrically opposed elongated slots in the surface thereof, the slots being angularly spaced about a spin axis, the slots of each pair of said two pair of slots lie on great circles which are oppositely oblique with respect to said spin axis, a rotor supported by said bearing means for rotary movement about three axes including said spin axis, said rotor and said bearing means having a first radial clearance therebetween, said rotor having a groove in the periphery thereof that extends less than 360 degrees about said spin axis so as to define a second radial clearance between said rotor and said bearing means different from the first radial clearance means for providing a flow of fluid between said rotor and said bearing means; the difference in radial clearance between the periphery of said rotor and said bearing means in conjunction with the flow of fluid therebetween being effective to provide a first pressure in the first radial clearance and a second pressure in the groove; means for rotating said rotor about said spin axis at a substantially constant angular velocity, the rotation of said rotor causing relative movement between said slots and said groove whereby each slot senses the first pressure for a portion of a revolution of said rotor and senses the second pressure for the remainder of the revolution so as to provide a single pressure pulse per revolution; a pair of bistable fluid amplifiers integral with said housing means; and means connecting the slots of each pair of said two pair of slots to the control ports of one of said pair of fluid amplifiers, whereby one of said pair of fluid amplifiers provides a first plurality of pressure pulses, the width of the pulses of the first plurality of pulses being indicative of the rotary movement of said rotor about the second of the three axes, and the other pair of said two pair of fluid amplifiers providing a second plurality of pressure pulses, the width of the pulses of the second plurality of pressure pulses being indicative of the rotary movement of said rotor about the third of the three axes.

4. A gyroscope comprising: housing means having a substantially spherical opening therein, said housing means having two pair of diametrically opposed elongated slots in the spherical surface thereof, the slots being angularly spaced about a spin axis, the slots of each pair of said two pair of slots lie on great circles which are oppositely oblique with respect to said spin axis; a rotor supported in said opening about three axes including said spin axis, said rotor and said housing means having a first radial clearance therebetween, said rotor having a groove in the periphery thereof that extends less than 360 degrees about said spin axis so as to define a second radial clearance between said rotor and said rotor and said housing means different from the first radial clearance; means for providing a flow of fluid between said rotor and said housing means; the difference in radial clearance between the periphery of said rotor and said housing means in conjunction with the flow of fluid therebetween being effective to provide a first pressure in the first radial clearance and a second pressure in the groove; means for rotating said rotor about said spin axis at a substantially constant angular velocity, the rotation of said rotor causing relative movement between said slots and said groove whereby each slot senses the first pressure for a portion of a revolution of said rotor and sense the second pressure for the remainder of the revolution so as to provide a single pressure pulse per revolution; a pair of bistable fluid amplifiers integral with said housing means; and means connecting the slots of each pair of said two pair of slots to the control ports of one of said pair of fluid amplifiers.

5. A gyroscope comprising: housing means; said housing means having two pair of opposed elongated slots therein angularly spaced about a spin axis, the slots of each pair of said two pair of slots being oppositely oblique, a rotor supported within said housing means about three axes including said spin axis, said rotor and said housing means having a first radial clearance therebetween, said rotor having a groove in the periphery thereof that extends less than 360 degrees about said spin axis so as to define a second radial clearance between said rotor and said housing means different from the radial clearance; means for providing a flow of fluid between said rotor and said housing means; the difference in radial clearance between the periphery of said rotor and said bearing means in conjunction with the flow of fluid therebetween being effective to provide a first pressure in the first radial clearance and a second pressure in the groove; means for rotating said rotor about said spin axis at a substantially constant angular velocity, the rotation of said rotor causing relative movement between said slots and said groove whereby each slot senses the first pressure for a portion of a revolution so as to provide a single pressure pulse for the remainder of the revolution so as to provide a single pressure pulse per revolution.

References Cited
UNITED STATES PATENTS

| | | | |
|---|---|---|---|
| 3,115,784 | 12/1963 | Parker | 74—5.7 X |
| 3,129,758 | 7/1964 | Lahde | 74—5.6 |
| 3,165,282 | 1/1965 | Noyes | 74—5.6 X |
| 3,187,588 | 6/1965 | Parker | 74—5.7 X |
| 3,254,538 | 6/1966 | Thomson | 74—5.7 |

FRED C. MATTERN, JR., *Primary Examiner.*

J. D. PUFFER, C. J. HUSAR, *Assistant Examiners.*